United States Patent
Moore (10) Patent No.: US 10,480,712 B2
(45) Date of Patent: Nov. 19, 2019

(54) SYSTEM AND METHOD FOR PREVENTING AIR IN LUBRICANT SUPPLY LINES

(71) Applicant: Caterpillar Inc., Peoria, IL (US)

(72) Inventor: Cody T. Moore, Lorena, TX (US)

(73) Assignee: Caterpillar Inc., Peoria, IL (US)

( * ) Notice: Subject to any disclaimer, the term of this patent is extended or adjusted under 35 U.S.C. 154(b) by 184 days.

(21) Appl. No.: 15/701,597

(22) Filed: Sep. 12, 2017

(65) Prior Publication Data

US 2018/0135800 A1    May 17, 2018

Related U.S. Application Data

(60) Provisional application No. 62/422,297, filed on Nov. 15, 2016.

(51) Int. Cl.
*F16N 13/16* (2006.01)
*F16N 7/36* (2006.01)
*F16N 7/38* (2006.01)
*F16N 39/00* (2006.01)
*B23Q 11/10* (2006.01)

(52) U.S. Cl.
CPC .......... *F16N 13/16* (2013.01); *F16N 7/36* (2013.01); *F16N 7/38* (2013.01); *F16N 39/002* (2013.01); *B23Q 11/10* (2013.01)

(58) Field of Classification Search
CPC ... B25D 17/26; B25D 2250/371; F16N 29/04; F16N 7/36; F16N 11/10
USPC ....................................................... 184/6.14
See application file for complete search history.

(56) References Cited

U.S. PATENT DOCUMENTS

| 1,459,681 | A | * | 6/1923 | Madden | B60R 17/00 |
|---|---|---|---|---|---|
| | | | | | 137/558 |
| 1,874,025 | A | * | 8/1932 | Clapp | H01H 35/18 |
| | | | | | 200/433 |
| 2,600,348 | A | * | 6/1952 | Walthers | F15B 13/0435 |
| | | | | | 137/625.6 |

(Continued)

FOREIGN PATENT DOCUMENTS

| CN | 103292144 | 9/2013 |
|---|---|---|
| DE | 202008006952 | 9/2008 |

(Continued)

*Primary Examiner* — Henry Y Liu (74) *Attorney, Agent, or Firm* — Finnegan, Henderson, Farabow, Garrett & Dunner, LLP (57) ABSTRACT

A lubrication system for a hydraulically operated tool has a common lubricant supply manifold that receives a lubricant from one or more lubricant reservoirs. The common lubricant supply manifold includes an inlet port through which the lubricant is received and an exit port fluidly coupled with a lubricant supply line. The system also has a primer pump connected in fluid communication with the common lubricant supply manifold, a main lubricant supply pump, and a spring check valve downstream of the main lubricant supply pump. The lubricant supply line receives lubricant from the exit port and supplies the lubricant to the main lubricant supply pump. The main lubricant supply pump increases the pressure of the lubricant and pumps the lubricant through the spring check valve and into a fluid passageway leading to the hydraulically operated tool. A detune valve is in fluid communication with a hydraulic pump providing pressurized hydraulic fluid for the tool and the main lubricant supply pump, and the detune valve is actuated by pressure in the lubricant supply line.

20 Claims, 3 Drawing Sheets

(56) References Cited

U.S. PATENT DOCUMENTS

| | | | | |
|---|---|---|---|---|
| 3,487,892 | A * | 1/1970 | Kiefer | F16N 13/04 184/27.1 |
| 3,729,064 | A * | 4/1973 | Wolf | B23B 31/26 184/6.14 |
| 3,926,279 | A * | 12/1975 | Thrasher | F16N 13/16 184/29 |
| 5,060,761 | A * | 10/1991 | Arndt | B25D 17/26 184/29 |
| 5,293,959 | A * | 3/1994 | Kimberlin | B25D 17/265 173/71 |
| 5,823,295 | A * | 10/1998 | Griffith | F16N 7/385 184/6.4 |
| 5,961,299 | A * | 10/1999 | Gruett | F16N 13/16 184/55.2 |
| 6,145,625 | A * | 11/2000 | Prokop | F16N 11/10 184/105.2 |
| 6,834,781 | B1 * | 12/2004 | Mueller | F16N 5/02 222/262 |
| 6,938,873 | B2 * | 9/2005 | Fischer | F01L 1/267 251/30.01 |
| 9,303,814 | B2 * | 4/2016 | Ifield | F16N 7/385 |
| 9,643,310 | B2 * | 5/2017 | Moore | B25D 9/08 |
| 2006/0243528 | A1 * | 11/2006 | Bukhari | F16N 7/36 184/27.1 |
| 2009/0277657 | A1 * | 11/2009 | Berger | B25D 17/24 173/114 |
| 2010/0236652 | A1 * | 9/2010 | Hattori | F15B 13/0403 137/625.42 |
| 2012/0043163 | A1 * | 2/2012 | Jagdale | B25D 17/26 184/6.4 |
| 2012/0132303 | A1 * | 5/2012 | Conley | F16N 7/14 137/565.17 |
| 2015/0047928 | A1 * | 2/2015 | Hiner | F15B 13/0403 184/6.14 |
| 2016/0046009 | A1 * | 2/2016 | Moore | B25D 9/08 184/6.14 |

FOREIGN PATENT DOCUMENTS

| | | |
|---|---|---|
| JP | 11141559 | 5/1999 |
| JP | 2013024286 | 2/2013 |
| WO | 2016115614 | 7/2016 |

\* cited by examiner

SYSTEM AND METHOD FOR PREVENTING AIR IN LUBRICANT SUPPLY LINES

TECHNICAL FIELD

The present disclosure relates generally to lubricant supply lines, and more particularly, to a system and method for preventing air in lubricant supply lines.

BACKGROUND

Hydraulically operated tools, such as hydraulic hammers for milling stone, concrete, and other materials may be mounted to various machines (e.g., excavators, backhoes, tool carriers, and other types of machines). For example, a hydraulic hammer may be mounted to a boom of a machine and connected to the machine's hydraulic system. High pressure fluid in the hydraulic system may be supplied to the hammer to drive a piston of the hammer in a reciprocating manner. The piston may, in turn, drive a work tool in a reciprocating manner, causing the work tool to break up material it contacts.

Lubrication systems are used to supply lubricant, such as grease, to bearing surfaces in the hydraulically operated tool to reduce friction between moving parts, such as between the tool bit and bushings that are used to align the tool bit. The lubrication system may be separate from the tool, for example by being mounted on a carrier machine, or mounted to the tool, i.e., an on-board system. Whether externally mounted or on-board, a lubricant supply is provided with the system. Operating the tools without lubrication can result in significant damage to the tools. Additionally, allowing air to get trapped in lubrication supply lines when the supply of lubricant runs low or when a cartridge of lubricant or other lubricant reservoir is replaced can result in a requirement to purge the air from the lubrication supply lines and prime the lubricant supply pump before operation of the hammer can continue. In order to monitor the amount of lubricant remaining, many systems provide inspection windows, so that an operator can visually monitor the amount of lubricant remaining. Such systems, however, are dependent on the operator taking the necessary steps to manually check the window, and do not assist with preventing air from becoming entrapped in the lubrication supply lines.

An exemplary lubrication system for a hydraulic hammer is disclosed in U.S. Patent Application Publication No. 2016/0046009 by Moore, published Feb. 18, 2016 ("the '009 publication"). Specifically, the '009 publication discloses a lubrication system for a tool powered by a drive fluid. The lubrication system includes a lubricant charge chamber having a variable volume, a drive fluid valve member, and a detune valve member configured to reduce or limit the amount of pressurized drive fluid being delivered to a piston of the tool. When a low amount of lubricant is detected within a lubricant reservoir from which the lubricant is supplied to the lubricant charge chamber, the tool is derated or detuned.

Although the lubrication system of the '009 publication may be suitable for some applications, it may still be desirable to provide additional features that prevent air from getting trapped in the lubricant supply lines when the pressure of the lubricant drops below a threshold or when additional or replacement sources of lubricant are added to the system. A means for preventing air from being drawn into the lubricant supply lines would eliminate the need to later purge the air and prime the lubricant pumps before continuing operation of the hydraulic tool.

The disclosed system and method are directed to overcoming one or more of the problems set forth above, and/or other problems known in the art.

SUMMARY

In one aspect, the present disclosure is directed to a lubrication system for a hydraulically operated tool. The system includes a common lubricant supply manifold configured to receive a lubricant from one or more lubricant reservoirs. The common lubricant supply manifold includes at least one inlet port through which the lubricant is received and at least one exit port fluidly coupled with a lubricant supply line. The lubrication system also includes a primer pump connected in fluid communication with the common lubricant supply manifold, a main lubricant supply pump, a spring check valve downstream of the main lubricant supply pump, and the lubricant supply line being configured to receive lubricant from the at least one exit port and supply the lubricant to the main lubricant supply pump. The main lubricant supply pump is configured to increase the pressure of the lubricant and pump the lubricant through the spring check valve and into a fluid passageway leading to the hydraulically operated tool. A detune valve in fluid communication with a hydraulic pump providing pressurized hydraulic fluid for the tool and the main lubricant supply pump is configured to be actuated by pressure in the lubricant supply line.

In another aspect, the present disclosure is directed to a method of lubricating a hydraulically operated tool and preventing the introduction of air into lubricant supply lines. The method includes receiving a lubricant at one or more inlets of a common lubricant supply manifold, increasing the pressure of the lubricant in the common lubricant supply manifold with a primer pump to a pressure that is greater than a first threshold pressure and less than a second threshold pressure, supplying the pressurized lubricant from the common lubricant supply manifold through one or more exit ports to a lubricant supply line, and sensing the pressure of the lubricant in the lubricant supply line at a detune valve. The detune valve is in fluid communication with a hydraulic pump providing pressurized hydraulic fluid for operating the tool, and for operating a main lubricant supply pump configured to receive lubricant from the lubricant supply line. The method further includes receiving the lubricant in the lubricant supply line at the main lubricant supply pump, and increasing the pressure of the lubricant with the main lubricant supply pump to a pressure that is greater than the second threshold pressure, and sufficient to pump the lubricant through a spring check valve and into a fluid passageway leading to the hydraulically operated tool. The detune valve is actuated by the pressure of the lubricant in the lubricant supply line dropping below the first threshold pressure to bypass the pressurized hydraulic fluid from being supplied to the main lubricant supply pump and stop operation of the main lubricant supply pump.

In yet another aspect, the present disclosure is directed to a hydraulic hammer including a housing, a cylinder contained within the housing, the cylinder configured to receive pressurized hydraulic fluid from a hydraulic fluid pump, a piston slidably mounted within the cylinder, the piston configured to be moved by the pressurized hydraulic fluid, a tool configured to be impacted by the piston, and a lubrication system configured to supply lubricant to the housing of the hydraulic hammer. The lubrication system includes a common lubricant supply manifold configured to receive a lubricant from one or more lubricant reservoirs, the common lubricant supply manifold including an inlet port through which the lubricant is received and an exit port fluidly coupled with a lubricant supply line fluidly coupled with the housing. The lubrication system also includes a primer pump connected in fluid communication with the common lubricant supply manifold, a main lubricant supply pump, and a spring check valve downstream of the main lubricant supply pump. The lubricant supply line is configured to receive lubricant from the exit port and supply the lubricant to the main lubricant supply pump. The main lubricant supply pump is configured to increase the pressure of the lubricant and pump the lubricant through the spring check valve and into a fluid passageway leading to the housing of the hydraulic hammer. A detune valve is in fluid communication with the hydraulic fluid pump providing pressurized hydraulic fluid to the cylinder of the hydraulic hammer, to the primer pump, and to the main lubricant supply pump, and the detune valve is configured to be actuated by pressure in the lubricant supply line.

DETAILED DESCRIPTION

Figure 1:
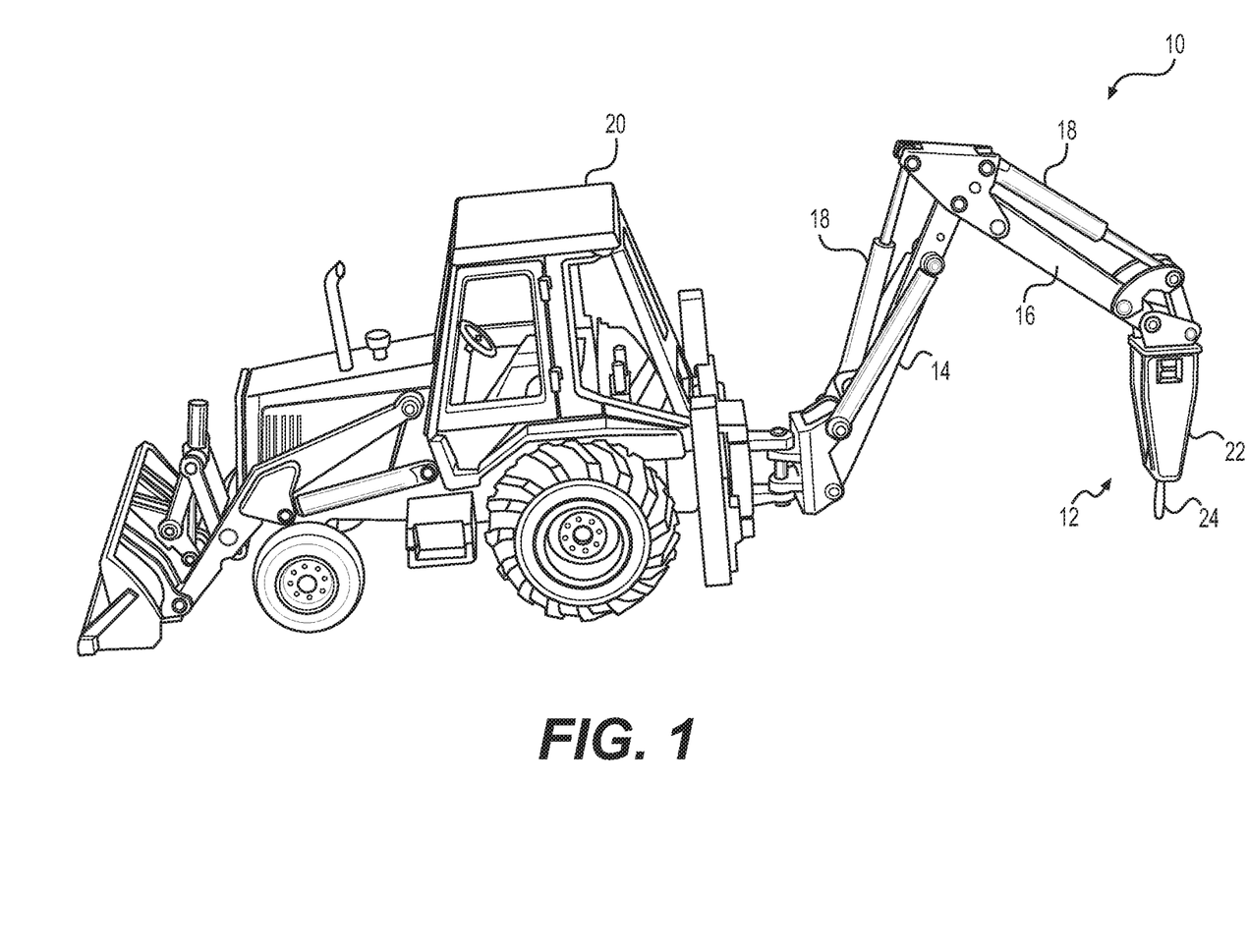
FIG. 1 is a perspective view of an exemplary disclosed machine.

FIG. 1 illustrates an exemplary disclosed machine 10 having a hydraulic hammer 12. The machine 10 may be configured to perform work associated with a particular industry such as, for example, mining or construction. The machine 10 may be a backhoe loader (shown in FIG. 1), an excavator, tool carrier, a skid steer loader, or any other type of machine. A hydraulic hammer 12 may be pivotally connected to the machine 10 through a boom 14 and a stick 16. Alternatively, the hammer 12 may be connected to the machine 10 in another way.

The machine 10 may include a hydraulic supply system (not shown in FIG. 1) for moving and powering the hammer 12. For example, the machine 10 may include a hydraulic fluid pump connected through one or more hydraulic fluid supply lines to hydraulic cylinders 18 associated with the boom 14 and the stick 16, and to the hammer 12. The hydraulic supply system may supply pressurized hydraulic fluid, for example oil, from the pump to the hydraulic cylinders 18 and the hammer 12. The hydraulic cylinders 18 may raise, lower, and/or swing the boom 14 and the stick 16 to correspondingly raise, lower, and/or swing the hammer 12. Operator controls for movement of the hydraulic cylinders 18 and/or the hammer 12 may be located within a cabin 20 of the machine 10.

As shown in FIG. 1, the hammer 12 may include a housing 22, which may be connected to the stick 16. A work tool 24 may be operatively connected to an end of the housing 22 opposite the stick 16. The work tool 24 may include any tool capable of interacting with the hammer 12. For example, the work tool 24 may include a chisel bit, moil point, percussion buster, blunt tool, ramming tool, tamping plate, cutter, or other bit.

Figure 2:
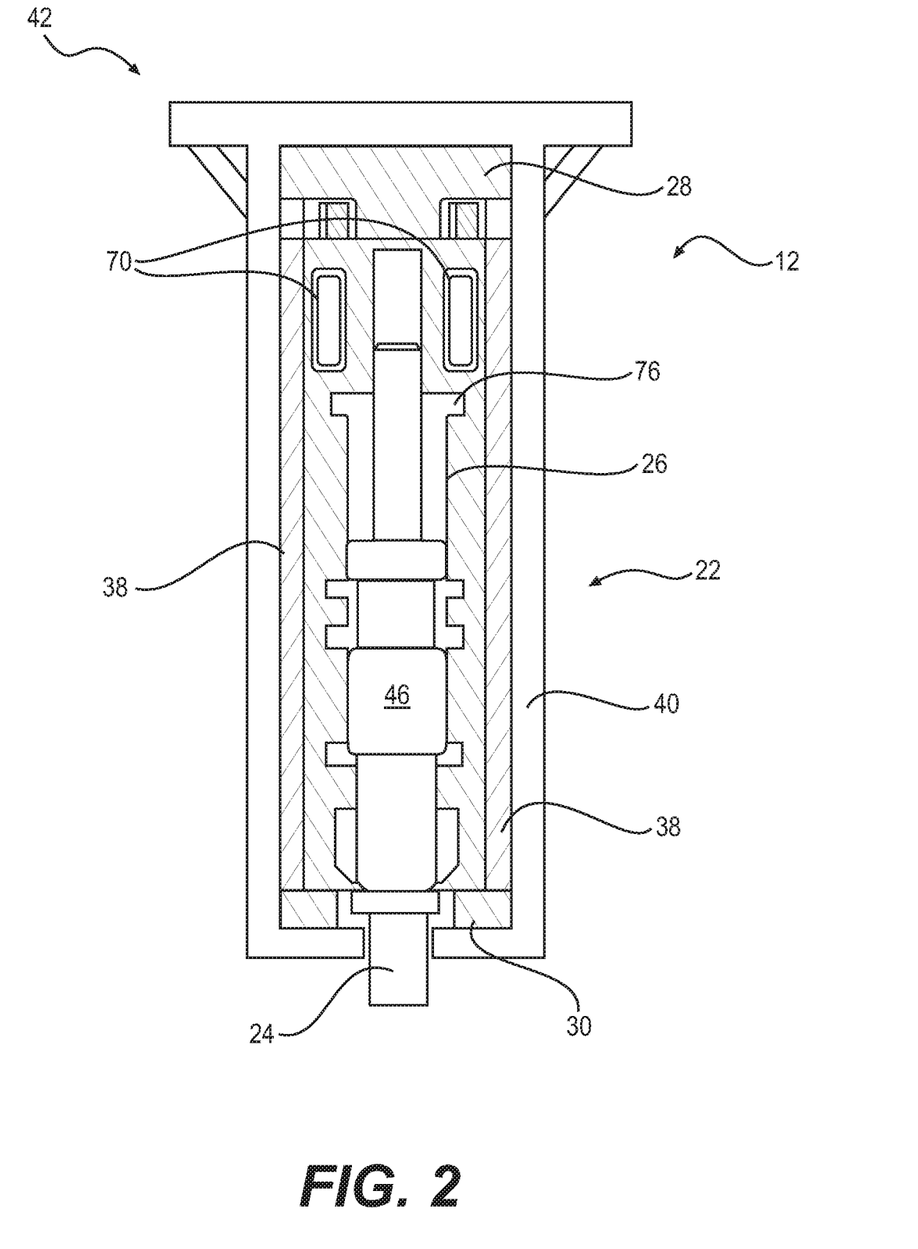
FIG. 2 is a cross-sectional view of a portion of an exemplary disclosed hydraulic hammer of the machine of FIG. 1.

As shown in FIG. 2, the hammer 12 may have a piston 46 and a cylinder 26 within the housing 22. The piston 46 may be configured to move back and forth within the cylinder 26 to impact the work tool 24. In some embodiments, the hammer 12 may also include a dual valve acceleration control system 70 to control the movement of the piston 46. The system 70 may do so by controlling the flow of pressurized fluid from a hydraulic fluid pump of the machine 10 to an acceleration channel 76. As pressurized fluid flows to the acceleration channel 76, it imparts a force on the piston 46 and may drive the piston 46 toward the work tool 24.

Still referring to FIG. 2, the housing 22 may include, among other things, a frame 40 and a head 42. The frame 40 may be a generally hollow body having one or more flanges or steps along its axial length. The head 42 may cap off one end of the frame 40. Specifically, one or more flanges on the head 42 may couple with one or more flanges on the frame 40 to provide a sealing engagement. One or more fasteners (not shown) may rigidly attach the head 42 to the frame 40. For example, the fasteners may include screws, nuts, bolts, tie rods, or any other fastener(s) capable of securing the two components. Additionally, the cylinder 26 may include holes to receive the fasteners, which may correspond with holes in the head 42.

The hammer 12 may also include a back buffer 28, a front buffer 30, and isolation sliding plates 38, all within the housing 22. As shown in FIG. 2, the front buffer 30 may be positioned within frame 40 between cylinder 26 and frame 40. Back buffer 28 may be positioned within the frame 40 between the head 42 and the cylinder 26. The isolation sliding plates 38 may be positioned between the frame 40 and the cylinder 26, and may be configured to extend along an inner wall of the frame 40 from the front buffer 30 toward the back buffer 28. As shown in FIG. 2, the isolation sliding plates 38 may extend up to and beyond the cylinder 26. The isolation sliding plates 38 may be configured to absorb noise and vibration and to work as sliding and wearing plates, which enable small axial movements of the cylinder 26 during operation. Lubrication is applied to the various bearing surfaces of the hammer 12 at intervals or continuously during operation of the hammer to reduce wear of the hammer components and also to assist with absorbing noise and vibration.

Figure 3:
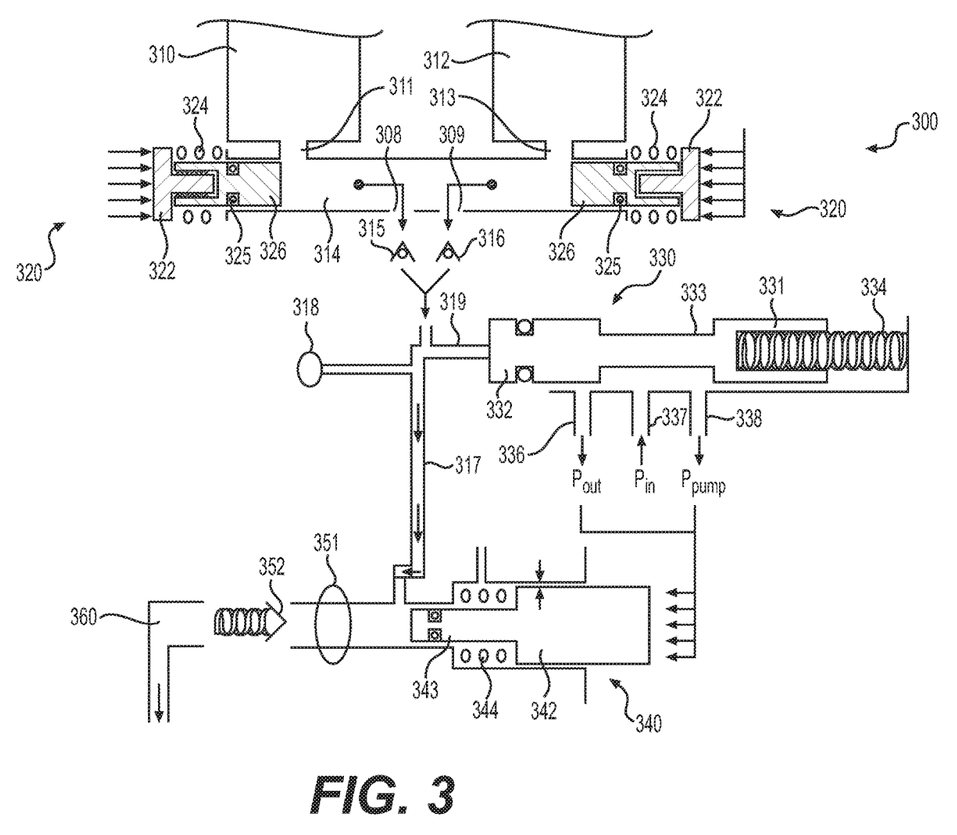
FIG. 3 is a schematic illustration of a lubrication system for a hydraulically operated tool.

As shown in FIG. 3, the hammer 12 may receive pressurized lubricant, such as grease, from a lubrication system 300. The grease, or other lubricant may be provided in one or more variable volume reservoirs, such as replaceable grease cartridges 310, 312. Lubricant from the cartridges 310, 312 is supplied into a common lubricant supply manifold 314, with various alternative embodiments of the lubricant supply system 300 including one or more cartridges. The number of cartridges may be determined by factors that include how long the hammer must operate without the ability to replace the cartridges, the amount of space available on the hammer for carrying the cartridges, and whether the lubrication system 300 will be provided integrally with the hammer or externally mounted with hoses or conduits connecting the lubrication system to the hammer.

In the exemplary embodiment of the lubrication system 300 illustrated in FIG. 3, two primer pumps 320 are connected in fluid communication with the common lubricant supply manifold 314. In various alternative embodiments of this disclosure, a lubricant supply manifold such as common lubricant supply manifold 314 may include one or more fluid passageways defined in a single solid manifold, multiple interconnected manifolds, separate conduits, hoses, or other means for directing the lubricant from one or more lubricant reservoirs to the hydraulically operated tool. The primer pumps 320 are piston pumps that operate to maintain a desired volume and pressure of the lubricant supplied from the one or more lubricant reservoirs connected to the common lubricant supply manifold 314. Each of the primer pumps 320 has sufficient pumping capacity to ensure that when one or more of the cartridges of lubricant connected to the common lubricant supply manifold is running low on lubricant, each of the primer pumps 320 can make up for any lack of volume of lubricant from those cartridges by pumping sufficient volume of lubricant from the remaining cartridge(s). The primer pumps 320 thereby ensure that no air is allowed to enter the lubricant supply manifold and lubricant supply lines when a cartridge runs low or is being replaced with a full cartridge.

As shown in FIG. 3, each primer pump 320 may be a piston pump including a piston member and a biasing member 324. The piston member may include a piston portion 322 with one end face exposed to hydraulic fluid pressure, and an opposite end face acted on by the biasing member 324. The piston member may also include a plunger portion 326 interconnected or integral with the piston portion 322, and slidably mounted in a fluid passageway connected to a distal end of the common lubricant supply manifold 314. A sealing element 325 such as an O-ring may be provided around the outer periphery of the plunger portion 326 to prevent lubricant from leaking by the plunger portion 326. Pressurized hydraulic fluid from a hydraulic fluid pump of the machine 10 acts on an end face of each piston portion 322, as represented by the parallel arrows in FIG. 3. The pressure may be supplied intermittently to drive each piston portion 322 and plunger portion 326 against the biasing force of the associated biasing member 324. The biasing member 324 may be a compression spring that applies a force to the piston portion 322 in an opposite direction to the force applied by the pressurized hydraulic fluid. Operation of each of the primer pumps 320 displaces a volume of lubricant from each of opposite, distal ends of the common lubricant supply manifold 314. The primer pumps 320 are configured to ensure that a continuous supply of lubricant is maintained within the lubricant supply manifold 314 as long as lubricant remains in at least one of the cartridges 310, 312. One of ordinary skill in the art will recognize that alternative configurations may include the primer pumps 320 positioned in other arrangements with respect to the common lubricant supply manifold 314. The location and operating capacity of the primer pumps prevents the introduction of air into the manifold when one or more cartridges are running low on lubricant or being replaced.

The common lubricant supply manifold 314 may include one or more inlet ports 311, 313 through which lubricant is received from one or more lubricant reservoirs, and one or more exit ports 308, 309 fluidly connected with a lubricant supply line 317 leading to a main lubricant supply pump 340. Each of the inlet ports 311, 313 may be positioned between an exit port 308, 309 and an associated primer pump 320. In the exemplary embodiment of FIG. 3, two separate lubricant reservoirs (grease cartridges) 310, 312 are connected to the lubricant supply manifold 314 at associated inlet ports 311, 313. A first primer pump 320 is connected to the lubricant supply manifold 314 upstream of the inlet port 311 from the exit port 308. A second primer pump 320 is connected to the lubricant supply manifold 314 upstream of the inlet port 313 from the exit port 309. A one-way check valve 315, 316 is positioned in each passageway leading from the exit ports 308, 309 to the lubricant supply line 317.

The exemplary embodiment of the lubrication system 300 shown in FIG. 3 provides each of the primer pumps 320 upstream of an inlet port from the exit ports in the manifold. Each of the inlet ports 311, 313 is in fluid communication with a lubricant reservoir, such as a replaceable grease cartridge 310, 312. This arrangement and the flow capacity of the primer pumps enables each of the primer pumps to maintain a sufficient supply of lubricant from an associated source of lubricant into the manifold 314 to ensure that no air is allowed into the lubricant supply line 317 from the manifold 314. The passageways leading from each of the exit ports 308, 309 may converge into the lubricant supply line 317 leading to the main lubricant supply pump 340. The main lubricant supply pump 340 may also be a piston pump, with a piston portion 342, interconnected or integral plunger portion 343, and biasing member 344. As shown in the exemplary embodiment of FIG. 3, the ratio of the surface area of an end face of the piston portion 342 exposed to hydraulic pressure to the surface area of an end face of the plunger portion 343 exposed to lubricant may be greater than the comparable ratio for the primer pumps 320. As a result, the same hydraulic pressure of pressurized hydraulic fluid received from a hydraulic fluid pump of the machine 10 will result in different displacement volumes of lubricant and lubricant pressures produced by the main pump 340 and the primer pumps 320. The same hydraulic pressure applied to the piston portions 322 of the primer pumps 320 will result in a higher displacement volume and a lower pressure than the volume and pressure resulting from application of that hydraulic pressure to the piston portion 342 of the main lubricant supply pump 340.

The higher displacement volume of lubricant pumped by the primer pumps 320 ensures that each primer pump can supply sufficient volume of lubricant from an associated cartridge or other lubricant reservoir to make up for any deficiency of lubricant in the lubricant supply manifold 314 supplied by another cartridge and primer pump. This feature ensures that air will not be allowed into the lubricant supply lines when a cartridge runs low on lubricant or is replaced. However, the lower pressure produced by the primer pumps 320 may be selected such that the primer pumps 320 do not produce sufficient lubricant pressure in the lubricant supply line 317 to open a spring check valve 352 downstream of the main lubricant supply pump 340. For example, in one exemplary embodiment, the primer pumps 320 may be configured to produce a pressure that is greater than approximately 50 bar but less than 80-100 bar, with the upper limit of the pressure being less than the actuation pressure for the spring check valve 352. In this exemplary embodiment, the main pump 340 may be configured to pump a lower volume of lubricant than the primer pumps 320, but at a lubricant pressure that is higher than the actuation pressure for the spring check valve 352. The higher pressure main pump is able to pump lubricant through an adjustable orifice 351, through the spring check valve 352 and through lubricant supply line 360 leading to the hammer 12 or other hydraulically operated tool.

A detune valve 330 is positioned in fluid communication with a pilot pressure line 319 off of the lubricant supply line 317 in order to sense the lubricant pressure in the supply line 317. The detune valve 330 is configured to control the supply of pressurized hydraulic fluid from the hydraulic fluid pump of the machine 10 to the main pump 340 as a function of the lubricant pressure in the supply line 317. The detune valve 330 includes a spool member that is biased against the lubricant pressure in pilot pressure line 319 by a biasing member 334 (e.g., a compression spring). The spool member in the exemplary embodiment shown in FIG. 3 is an integral member with two lands 331 and 332, and a groove 333 defined between the two lands. One of ordinary skill in the art will recognize that alternative embodiments may include the detune valve 330 comprising additional lands and grooves, or multiple components that interact to perform the same functions as the integral spool member. The biasing member 334 is selected to exert a biasing force that is sufficient to move the spool member of the valve 330 to the left in FIG. 3 when the pressure in the lubricant supply line 317 drops below a threshold pressure. The threshold pressure is a pressure in the lubricant supply line 317 below which there is a danger of air entering the lubricant supply lines. When the detune valve 330 is in the far right position of FIG. 3, the groove 333 of the spool member overlaps and interconnects a hydraulic flow passage 337 configured to receive hydraulic fluid pressure $P_{in}$ from the hydraulic fluid pump of the machine 10, and a hydraulic flow passage 338 configured to supply the hydraulic fluid pressure $P_{pump}$ to the main lubricant supply pump 340. In this far right position the hydraulic fluid pressure $P_{pump}$ drives the main lubricant supply pump 340 to supply lubricant from the supply line 317 through the adjustable orifice 351 and spring check valve 352 to the line 360 leading to the hammer 12.

When lubricant pressure in the lubricant supply line 317 and pilot pressure line 319 drops below the threshold at which there is a danger of air being introduced into the lines, the biasing member 334 moves the spool member of detune valve 330 to the left. When the spool member is moved to the left by the biasing member 334, as viewed in the exemplary embodiment of FIG. 3, the left land 332 moves past hydraulic flow passage $P_{out}$, the groove 333 overlaps the hydraulic flow passages $P_{out}$ and $P_{in}$, and the right land 331 covers the hydraulic flow passage $P_{pump}$. In this far left position the hydraulic fluid pressure from the hydraulic fluid pump of the machine 10 is bypassed from hydraulic flow passage $P_{in}$ to $P_{out}$, and cut off from the hydraulic flow passage $P_{pump}$ leading to the main lubricant supply pump 340. As a result, when the lubricant pressure in the lubricant supply line 317 drops below the threshold pressure, the main lubricant supply pump 340 can no longer operate to continue pumping lubricant to the hammer 12. In this configuration, an operator would notice the change in operation of the hammer as it would slow down, and the operator would notice audible and productivity differences in the performance of the tool. As a result, operation of the tool can be stopped before any air is introduced into the lubricant supply lines. Stopping operation of the main lubricant supply pump 340 when the pressure in the lubricant supply line 317 drops below the threshold prevents the main pump 340 from continuing to displace lubricant through the spring check valve 352 after an insufficient supply of lubricant remains in the supply line.

INDUSTRIAL APPLICABILITY

The disclosed lubrication system may be used with any hydraulically operated tool, such as a hydraulic hammer, where the hydraulic pressure used to operate the tool is also used to pump lubricant to the tool. Various aspects of the disclosed exemplary embodiments of the lubrication system prevent air from getting trapped in the lubricant supply lines when the pressure of the lubricant drops below a threshold or when additional or replacement sources of lubricant are added to the system. Primer pumps associated with the replaceable or refillable lubricant reservoirs connected to the lubricant supply manifold ensure that no air enters the system. Each of the primer pumps is able to provide sufficient volume of lubricant from an associated lubricant reservoir to make up for any deficiency of lubricant from the remaining reservoirs. The detune valve of the lubrication system also provides an operator with a readily detectable warning that pressure in the lubricant supply lines has fallen below a threshold at which operation of the tool should be stopped in order to add lubricant to the system. The warning to an operator results from the noticeable change in the operation of the hydraulic tool when the detune valve causes the hydraulic fluid to bypass the main lubricant supply pump if lubricant pressures in the lubricant supply line drop below a threshold pressure. The various disclosed aspects prevent air from being drawn into the lubricant supply lines, and therefore eliminate the need to later purge the air and prime the lubricant pumps before continuing operation of the hydraulic tool.

The disclosed lubrication system enables a method of lubricating a hydraulically operated tool while preventing the introduction of air into lubricant supply lines. The method may include receiving a lubricant at one or more inlets of a common lubricant supply manifold. As shown in the exemplary implementation of FIG. 3, one or more lubricant reservoirs, such as individual grease cartridges 310, 312, may be replaceably connected to the common lubricant supply manifold 314 at inlets 311, 313, respectively. Alternative implementations may include connecting only one grease cartridge to the lubricant supply manifold, or connecting more than two grease cartridges to the manifold.

The pressure and volume of the lubricant maintained in the common lubricant supply manifold may be increased with one or more primer pumps that are mounted in fluid communication with the common lubricant supply manifold. Each primer pump 310, 312 may increase the pressure of lubricant in the supply manifold 314 to a pressure that is greater than a first threshold pressure and less than a second threshold pressure. In one exemplary implementation, each primer pump may be driven by pressurized hydraulic fluid received from a hydraulic fluid pump, resulting in the primer pump generating a lubricant pressure in the supply manifold that is greater than a first threshold pressure, such as 50 bar, but less than a second threshold pressure that falls within a range from approximately 80-100 bar. The hydraulic fluid pump may be on a machine carrying the hydraulically operated tool. The hydraulic fluid pump may also supply pressurized hydraulic fluid to various hydraulic cylinders on the machine such as the hydraulic cylinders 18 associated with the boom 14 and the stick 16 on the machine 10 in FIG. 1. Each of the primer pumps 320 also displaces sufficient volume of the lubricant such that when one source of lubricant fluidly connected to the lubricant supply manifold is running low on lubricant, the primer pump can make up for any deficiency by pumping enough volume of lubricant from another source of lubricant fluidly connected to the lubricant supply manifold. The pressurized lubricant in the common lubricant supply manifold may be supplied through one or more exit ports 308, 309 to a lubricant supply line 317. In some circumstances it may be desirable to be able to manually add additional lubricant to lubricant supply line 317, so a manual grease fitting 318 may also be connected to the lubricant supply line 317.

The detune valve 330 may sense the pressure of the lubricant in the lubricant supply line 317 through the pilot line 319 branched off of the lubricant supply line 317. The detune valve 330 may be in fluid communication with the hydraulic fluid pump providing pressurized hydraulic fluid for operating the tool 12, the primer pumps 320, and the main lubricant supply pump 340. As shown in the exemplary embodiment of FIG. 3, a hydraulic flow passage 337 may supply pressurized hydraulic fluid $P_{in}$ from the hydraulic pump to the detune valve 330. Another hydraulic flow passage 338 may supply pressurized hydraulic fluid $P_{pump}$ to the main lubricant supply pump 340. Yet another hydraulic flow passage 336 may direct the pressurized hydraulic fluid $P_{out}$ away from the detune valve 330, bypassing the main lubricant supply pump 340.

The main lubricant supply pump 340 receives lubricant from the lubricant supply line 317, and increases the pressure of the lubricant to a pressure that is greater than the second threshold pressure, and sufficient to pump the lubricant through the spring check valve 352 and into the lubricant supply line 360 leading to the hydraulically operated tool 12. The detune valve 330 is actuated by the pressure of the lubricant in the lubricant supply line 317 dropping below the first threshold pressure, resulting in the pressurized hydraulic fluid bypassing the main lubricant supply pump, and thereby stopping operation of the main lubricant supply pump. The biasing member 334 of the detune valve 330 is selected to exert just enough force on the spool member of the detune valve 330 to overcome the force on the spool member generated by a lubricant pressure in the lubricant supply line 317 that is less than the first threshold pressure.

In the exemplary implementation of the lubrication system shown in FIG. 3, lubricant is received at two spaced inlet ports 311, 313 of the common lubricant supply manifold 314 from two replaceable lubricant cartridges 310, 312. The lubricant is supplied from the common lubricant supply manifold 314 through two exit ports 308, 309 in the lubricant supply manifold that are positioned in between the two spaced inlet ports and into the lubricant supply line 317 through one-way check valves configured to prevent lubricant from flowing back through the exit ports into the lubricant supply manifold. A first primer pump 320 is fluidly coupled to a first end of the common lubricant supply manifold 314 upstream from a first one of the two spaced inlet ports 311, 313, and a second primer pump 320 is fluidly coupled to a second, opposite end of the common lubricant supply manifold upstream from a second one of the two spaced inlet ports.

The detune valve 330 is actuated to a first position (to the right in the exemplary implementation shown in FIG. 3) against a biasing force generated by the biasing member 334 when a lubricant pressure in the lubricant supply line 317 is greater than or equal to the first threshold pressure. When the detune valve 330 is in this first position, the spool member is moved such that one land 332 blocks the bypass hydraulic flow passage 336 ($P_{out}$), and the groove 333 connects the hydraulic flow passage 337 ($P_{in}$) with the hydraulic flow passage 338 ($P_{pump}$), thereby directing pressurized hydraulic fluid from the hydraulic pump to the main lubricant supply pump 340. The detune valve 330 is actuated to a second position (to the left in the exemplary implementation shown in FIG. 3) by the biasing force of the biasing member 334 when the lubricant pressure in the lubricant supply line 317 is less than the first threshold pressure. When the detune valve 330 is in this second position, the spool member is moved such that the land 331 blocks the hydraulic flow passage 338 ($P_{pump}$), and the groove 333 connects the hydraulic flow passage 337 ($P_{in}$) with the bypass hydraulic flow passage 336 ($P_{out}$), such that the pressurized hydraulic fluid is not supplied to the main lubricant supply pump 340.

As further shown in the exemplary implementation of FIG. 3, the primer pumps 320 and the main lubricant supply pump 340 are each piston pumps operated by pressurized hydraulic fluid from the hydraulic pump. The same pressure of pressurized hydraulic fluid supplied from the hydraulic pump to the primer pumps 320 and to the main lubricant supply pump 340 results in each of the primer pumps 320 displacing a greater volume of lubricant than displaced by the main lubricant supply pump 340. Furthermore, the same pressure of pressurized hydraulic fluid supplied from the hydraulic pump to the primer pumps 320 and to the main lubricant supply pump 340 results in the main lubricant supply pump 340 producing a greater pressure of lubricant than produced by each of the primer pumps 320. This result is achieved by providing each of the primer pumps 320 with a smaller ratio between a surface area of the piston portion 322 acted on by the hydraulic pressure to the surface area of the plunger portion 326 acting on the lubricant than the comparable ratio for the main lubricant supply pump 340.

It will be apparent to those skilled in the art that various modifications and variations can be made to the disclosed lubrication system. Other embodiments will be apparent to those skilled in the art from consideration of the specification and practice of the disclosed lubrication system. It is intended that the specification and examples be considered as exemplary only, with a true scope being indicated by the following claims and their equivalents.

What is claimed is:

1. A lubrication system for a hydraulically operated tool, the system comprising:
   a common lubricant supply manifold configured to receive a lubricant from one or more lubricant reservoirs, the common lubricant supply manifold including at least one inlet port through which the lubricant is received and at least one exit port fluidly coupled with a lubricant supply line;
   a primer pump connected in fluid communication with the common lubricant supply manifold;
   a main lubricant supply pump;
   a spring check valve downstream of the main lubricant supply pump;
   the lubricant supply line being configured to receive lubricant from the at least one exit port and supply the lubricant to the main lubricant supply pump;
   the main lubricant supply pump being configured to increase the pressure of the lubricant and pump the lubricant through the spring check valve and into a fluid passageway leading to the hydraulically operated tool; and
   a detune valve in fluid communication with a hydraulic pump providing pressurized hydraulic fluid for the tool and the main lubricant supply pump, the detune valve configured to be actuated by pressure in the lubricant supply line.

2. The lubrication system of claim 1, wherein:
   the one or more lubricant reservoirs include two replaceable lubricant cartridges connected to the lubricant supply manifold at two spaced inlet ports; and
   two exit ports in the lubricant supply manifold in between the two spaced inlet ports are each fluidly coupled with the lubricant supply line through a one-way check valve configured to prevent lubricant from flowing back through the exit port into the lubricant supply manifold.

3. The lubrication system of claim 2, further including two primer pumps, wherein a first one of the two primer pumps is fluidly coupled to a first end of the lubricant supply manifold upstream from a first one of the two spaced inlet ports, and a second one of the two primer pumps is fluidly coupled to a second, opposite end of the lubricant supply manifold upstream from a second one of the two spaced inlet ports.

4. The lubrication system of claim 3, wherein the two primer pumps and the main lubricant supply pump are piston pumps.

5. The lubrication system of claim 1, wherein the primer pump is configured to produce a lubricant pressure in the lubricant supply manifold and in the lubricant supply line that is greater than a first threshold pressure and less than a second threshold pressure sufficient to open the spring check valve downstream of the main lubricant supply pump.

6. The lubrication system of claim 5, wherein the detune valve is configured to be actuated to a first position against a biasing force by a lubricant pressure in the lubricant supply line that is greater than or equal to the first threshold pressure, and direct pressurized hydraulic fluid from the hydraulic pump to the main lubricant supply pump when the detune valve is in the first position.

7. The lubrication system of claim 6, wherein the detune valve is configured to be actuated to a second position by the biasing force when the lubricant pressure in the lubricant supply line is less than the first threshold pressure, and bypass the pressurized hydraulic fluid from the hydraulic pump such that the pressurized hydraulic fluid is not supplied to the main lubricant supply pump when the detune valve is in the second position.

8. The lubrication system of claim 1, wherein the primer pump and the main lubricant supply pump are each piston pumps operated by pressurized hydraulic fluid from the hydraulic pump.

9. The lubrication system of claim 8, wherein a pressure of pressurized hydraulic fluid supplied from the hydraulic pump to the primer pump and to the main lubricant supply pump results in the primer pump displacing a greater volume of lubricant than displaced by the main lubricant supply pump, and the main lubricant supply pump producing a greater pressure of lubricant than produced by the primer pump.

10. A method of lubricating a hydraulically operated tool and preventing the introduction of air into lubricant supply lines, the method comprising:
receiving a lubricant at one or more inlets of a common lubricant supply manifold;
increasing the pressure of the lubricant in the common lubricant supply manifold with a primer pump to a pressure that is greater than a first threshold pressure and less than a second threshold pressure;
supplying the pressurized lubricant from the common lubricant supply manifold through one or more exit ports to a lubricant supply line;
sensing the pressure of the lubricant in the lubricant supply line at a detune valve, the detune valve being in fluid communication with a hydraulic pump providing pressurized hydraulic fluid for operating the tool, and for operating a main lubricant supply pump configured to receive lubricant from the lubricant supply line;
receiving the lubricant in the lubricant supply line at the main lubricant supply pump; and
increasing the pressure of the lubricant with the main lubricant supply pump to a pressure that is greater than the second threshold pressure, and sufficient to pump the lubricant through a spring check valve and into a fluid passageway leading to the hydraulically operated tool, wherein the detune valve is actuated by the pressure of the lubricant in the lubricant supply line dropping below the first threshold to bypass the pressurized hydraulic fluid from being supplied to the main lubricant supply pump and stop operation of the main lubricant supply pump.

11. The method of claim 10, wherein:
lubricant is received at two spaced inlet ports of the common lubricant supply manifold from two replaceable lubricant cartridges; and
lubricant is supplied from the common lubricant supply manifold through two exit ports in the lubricant supply manifold that are positioned in between the two spaced inlet ports and into the lubricant supply line through one-way check valves configured to prevent lubricant from flowing back through the exit ports into the lubricant supply manifold.

12. The method of claim 11, further including fluidly coupling a first primer pump to a first end of the common lubricant supply manifold upstream from a first one of the two spaced inlet ports, and fluid coupling a second primer pump to a second, opposite end of the common lubricant supply manifold upstream from a second one of the two spaced inlet ports.

13. The method of claim 10, further including:
actuating the detune valve to a first position against a biasing force when a lubricant pressure in the lubricant supply line is greater than or equal to the first threshold pressure; and
directing pressurized hydraulic fluid from the hydraulic pump to the main lubricant supply pump when the detune valve is in the first position.

14. The method of claim 13, further including:
actuating the detune valve to a second position by the biasing force when the lubricant pressure in the lubricant supply line is less than the first threshold pressure; and
bypassing the pressurized hydraulic fluid from the hydraulic pump such that the pressurized hydraulic fluid is not supplied to the main lubricant supply pump when the detune valve is in the second position.

15. The method of claim 10, wherein the primer pump and the main lubricant supply pump are each piston pumps operated by pressurized hydraulic fluid from the hydraulic pump.

16. The method of claim 15, wherein a pressure of pressurized hydraulic fluid supplied from the hydraulic pump to the primer pump and to the main lubricant supply pump results in the primer pump displacing a greater volume of lubricant than displaced by the main lubricant supply pump, and the main lubricant supply pump producing a greater pressure of lubricant than produced by the primer pump.

17. A hydraulic hammer, comprising:
a housing;
a cylinder contained within the housing, the cylinder configured to receive pressurized hydraulic fluid from a hydraulic fluid pump;
a piston slidably mounted within the cylinder, the piston configured to be moved by the pressurized hydraulic fluid;
a tool configured to be impacted by the piston; and
a lubrication system configured to supply lubricant to the housing of the hydraulic hammer, the lubrication system comprising:
a common lubricant supply manifold configured to receive a lubricant from one or more lubricant reservoirs, the common lubricant supply manifold including at least one inlet port through which the lubricant is received and at least one exit port fluidly coupled with a lubricant supply line fluidly coupled with the housing;

a primer pump connected in fluid communication with the common lubricant supply manifold;

a main lubricant supply pump;

a spring check valve downstream of the main lubricant supply pump;

the lubricant supply line being configured to receive lubricant from the at least one exit port and supply the lubricant to the main lubricant supply pump;

the main lubricant supply pump being configured to increase the pressure of the lubricant and pump the lubricant through the spring check valve and into a fluid passageway leading to the housing of the hydraulic hammer; and a detune valve in fluid communication with the hydraulic fluid pump providing pressurized hydraulic fluid to the cylinder of the hydraulic hammer, to the primer pump, and to the main lubricant supply pump, the detune valve being configured to be actuated by pressure in the lubricant supply line.

18. The hydraulic hammer of claim 17, wherein:

the one or more lubricant reservoirs include two replaceable lubricant cartridges connected to the lubricant supply manifold at two spaced inlet ports; and two exit ports in the lubricant supply manifold in between the two spaced inlet ports are each fluidly coupled with the lubricant supply line through a one-way check valve configured to prevent lubricant from flowing back through the exit port into the lubricant supply manifold.

19. The hydraulic hammer of claim 18, further including two primer pumps, wherein a first one of the two primer pumps is fluidly coupled to a first end of the lubricant supply manifold upstream from a first one of the two spaced inlet ports, and a second one of the two primer pumps is fluidly coupled to a second, opposite end of the lubricant supply manifold upstream from a second one of the two spaced inlet ports.

20. The hydraulic hammer of claim 17, wherein:

the primer pump is configured to produce a lubricant pressure in the lubricant supply manifold and in the lubricant supply line that is greater than a first threshold pressure and less than a second threshold pressure sufficient to open the spring check valve downstream of the main lubricant supply pump;

the detune valve is configured to be actuated to a first position against a biasing force by a lubricant pressure in the lubricant supply line that is greater than or equal to the first threshold pressure, and direct pressurized hydraulic fluid from the hydraulic pump to the main lubricant supply pump when the detune valve is in the first position; and the detune valve is configured to be actuated to a second position by the biasing force when the lubricant pressure in the lubricant supply line is less than the first threshold pressure, and bypass the pressurized hydraulic fluid from the hydraulic pump such that the pressurized hydraulic fluid is not supplied to the main lubricant supply pump when the detune valve is in the second position.

* * * * *